United States Patent

Zymboly

[11] Patent Number: 4,751,152
[45] Date of Patent: Jun. 14, 1988

[54] HIGH BULK SELF-SUPPORTING ELECTRODE WITH INTEGRAL GAS FEED CONDUIT FOR SOLID OXIDE FUEL CELLS

[75] Inventor: Gregory E. Zymboly, Penn Hills, Pa.

[73] Assignee: Westinghouse Electric Corp., Pittsburgh, Pa.

[21] Appl. No.: 34,454

[22] Filed: Apr. 6, 1987

[51] Int. Cl.⁴ ............................................. H01M 4/86
[52] U.S. Cl. ...................................... 429/31; 429/34; 429/40
[58] Field of Search ..................................... 429/30–33, 429/34, 40, 41

[56] References Cited

U.S. PATENT DOCUMENTS

| | | | |
|---|---|---|---|
| 4,395,468 | 7/1983 | Isenberg | 429/31 |
| 4,490,444 | 12/1984 | Isenberg | 429/31 |
| 4,562,124 | 12/1985 | Ruka | 429/30 |
| 4,596,750 | 6/1986 | Ruka et al. | 429/16 |
| 4,598,028 | 7/1986 | Rossing et al. | 429/30 |
| 4,640,875 | 2/1987 | Makiel | 429/30 |

Primary Examiner—Anthony Skapars
Attorney, Agent, or Firm—Daniel P. Cillo

[57] ABSTRACT

A porous, self-supporting, elongated electrode is made, having a closed end, an inner wall defining a gas feed conduit, and at least one other gas exit conduit within the structure, where the conduits communicate with each other near the closed end of the structure.

10 Claims, 4 Drawing Sheets

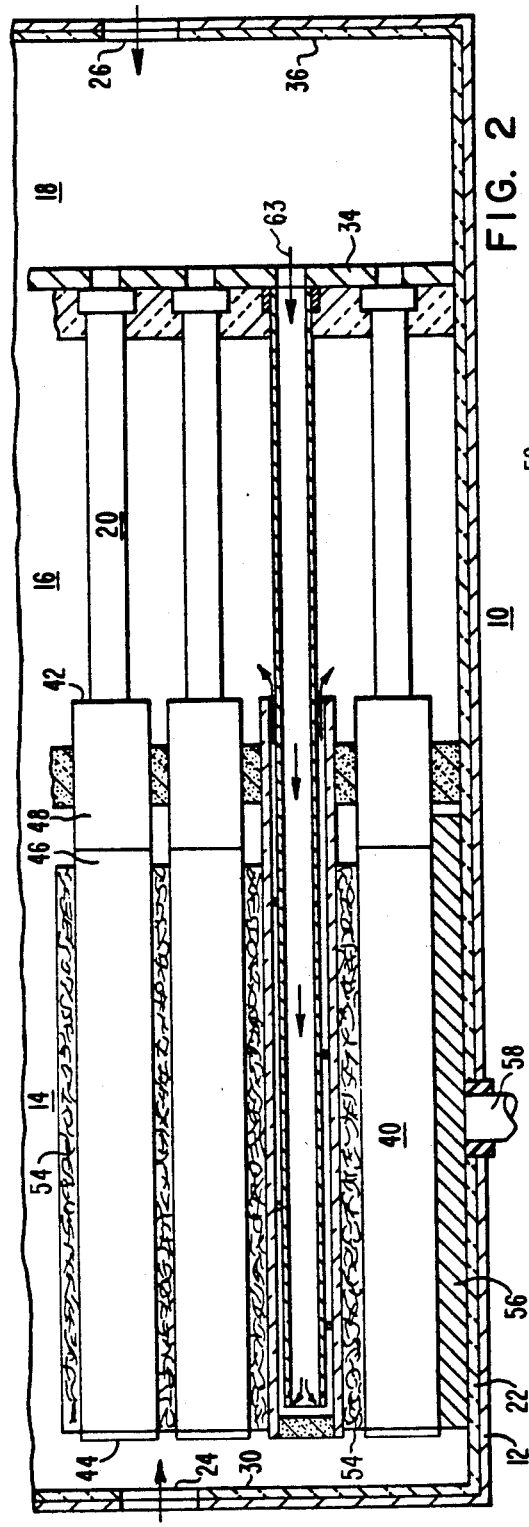
FIG. 2
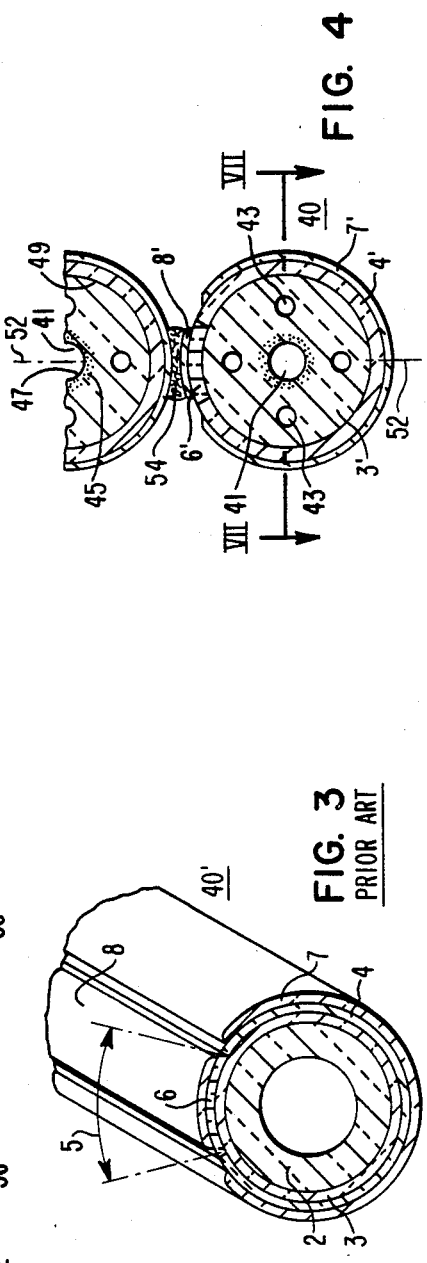
FIG. 3 PRIOR ART
FIG. 4

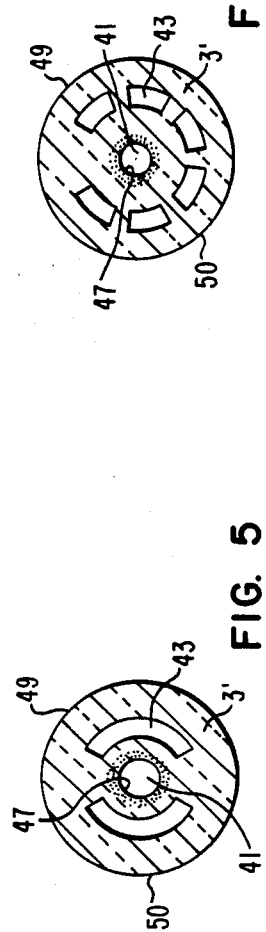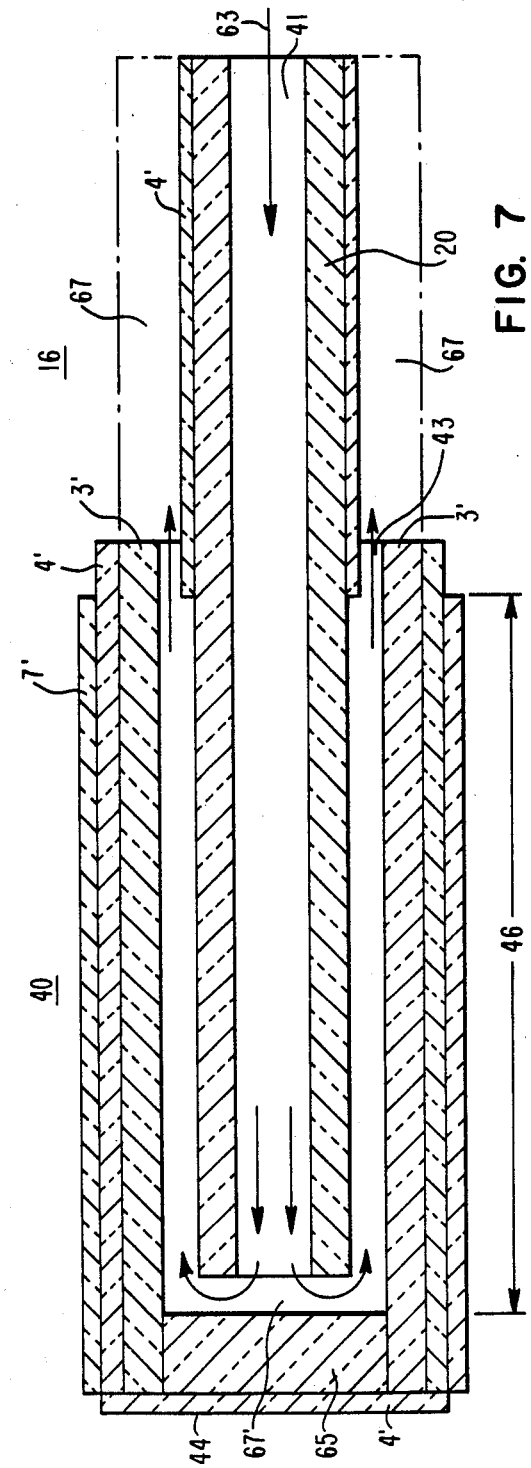

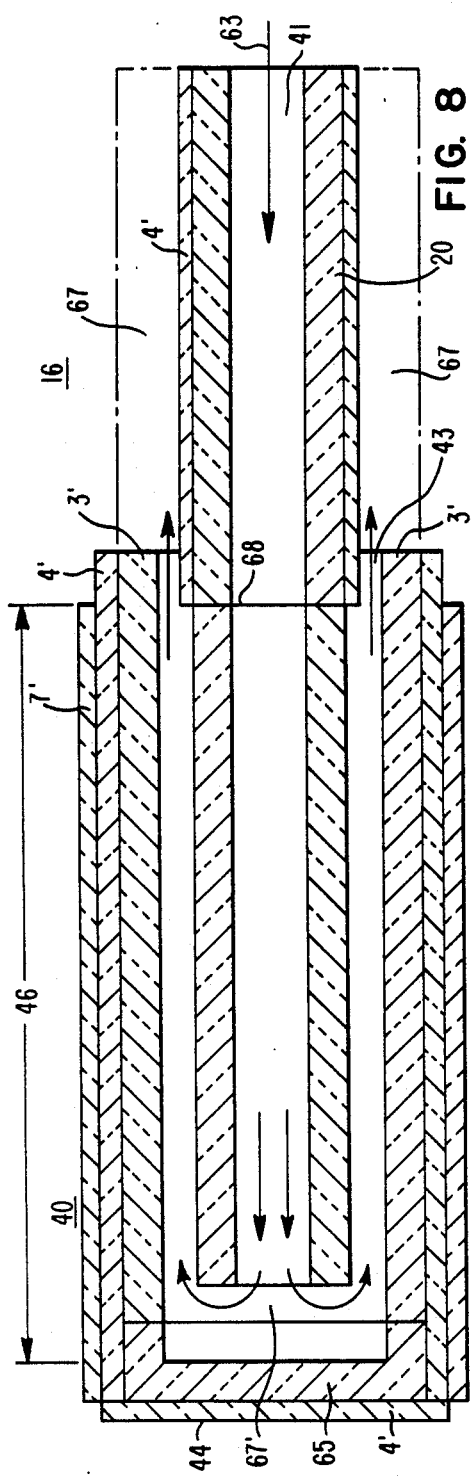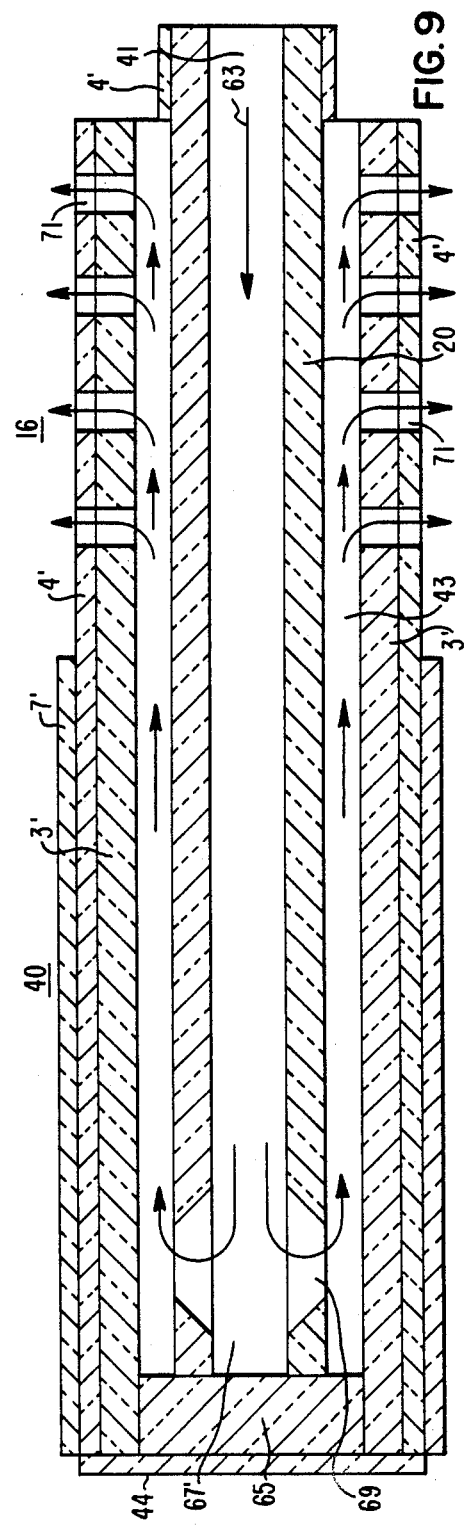

HIGH BULK SELF-SUPPORTING ELECTRODE WITH INTEGRAL GAS FEED CONDUIT FOR SOLID OXIDE FUEL CELLS

BACKGROUND OF THE INVENTION

High temperature, solid oxide electrolyte fuel cell configurations, and fuel cell generators, are well known in the art, and are taught by Isenberg, in U.S. Pat. Nos. 4,395,468 and 4,490,444. These fuel cell configurations comprise a plurality of individual, series and parallel electronically connected, axially elongated, generally tubular, annular cells, Each cell is electronically connected in series to an adjacent cell in a column, through cell interconnections extending the full axial length of each cell. This series interconnection contacts the air electrode of one cell and the fuel electrode of an adjacent cell, through a metallic coating and a fiber metal felt.

Each fuel cell is formed on a long, electronically insulating, porous support tube, generally made of calcia stabilized zirconia, which provides structural integrity for the fuel cell. Surrounding, and deposited on this support tube, is a thin, porous air electrode, generally about 20 microns to 200 microns, thick, deposited by well known techniques. The air electrode can be comprised of doped or undoped oxides or mixtures of oxides in the pervoskite family, such as $LaMnO_3$, $CaMnO_3$, $LaNiO_3$, $LaCoO_3$, $LaCrO_3$, and the like. Generally surrounding the outer periphery of the air electrode is a gas tight, solid electrolyte, usually of yttria stabilized zirconia. Substantially surrounding the solid electrolyte is an outer, porous, fuel electrode, usually of nickel-zirconia cermet. Both the solid electrolyte and outer electrode are discontinuous to allow inclusion of an electrical interconnection material for series connection between cells. A separate, single, open end, thin, oxidant injector tube is used in the interior of each fuel cell, to flow gaseous oxidant into the cell. The oxidant contacts the support and diffuses through it to the air electrode.

Many improvements have been made to the support tube for the fuel cell. Ruka et al., in U.S. Pat. No. 4,596,750, provided a fluorite type support tube material which would be better able to resist cracking due to migration of lanthanum or manganese materials contained in the contacting air electrode, at fuel cell operating temperatures of about 1000° C. Rossing et al., in U.S. Pat. No. 4,598,028, provided lighter weight, thinner, higher strength support tubes, which utilized a ceramic powder and ceramic fiber combination, allowing reduction of the oxygen path length to the air electrode through the support. Improvements have also been made to the air electrode, for example, Ruka, in U.S. Pat. No. 4,562,124, taught introduction of small amounts of cerium into the air electrode material, to provide a better match of coefficient of thermal expansion with the support tube.

A problem with electron flow through the air electrode remained, however. Electronic current flow through the air electrode to the interconnection, which connects the next cell electronically in series, was confined to the thin circumferential path of the air electrode around the non-electronically conductive, porous support tube, and the enclosed, central oxidant inlet chamber, providing a somewhat high electronic resistance. This current path resulted in a circumferential voltage gradient, and did not provide for complete uniformity in cell current density.

In addition, it has always been difficult to match the thermal expansion coefficients of the support and contacting air electrode, and to prevent some migration of air electrode material into the support at the 1000° C. operating temperature of the cell in a fuel cell generator. Finally, supporting the thin, fragile, oxidant injector tubes centrally within each fuel cell was a difficult operation. What is needed is a new design for the fuel cell, eliminating the fragile oxidant injector tube within the cell and eliminating the problems of circumferential current flow, thermal mismatch, and material migration, while still providing a strong support for the electrolyte, fuel electrode, and interconnection.

SUMMARY OF THE INVENTION

The aforementioned needs have been met and problems solved by the present invention, which in its broadest aspects provides a self-supporting, axially elongated, unitary electrode structure having an open end and a closed end, and having at least two conduits through its length connected near the closed end. Preferably a plurality of conduits are near its outer side wall with at least one additional conduit disposed inwardly from the conduits near the side wall.

More specifically, in a preferred embodiment, the structure has an inner and outer wall, where the inner wall defines a conduit, preferably a central gas feed conduit parallel to the structure's longitudinal axis, through the length of the electrode structure, and where the area between the walls contains at least one other conduit, preferably a gas exit conduit through the length of the electrode structure. The end of the elongated electrode structure will be hollow, and capped or otherwise closed by a variety of designs. The conduits will communicate, i.e., connect with each other near the closed end, so that gas entering by way of the gas feed conduit will reverse direction and flow through the exit conduit in a direction countercurrent to the feed gas.

The term "communicate", is used to describe means within the electrode allowing entering gas to pass from the conduit defined by the inner wall to other conduits within the electrode structure. In preferred embodiments, a single gas feed conduit portion of an air electrode will be centrally located and will feed oxidant, there will be at least four gas exit conduits, and the electrode structure will be more dense near the central gas feed conduit than near the outer wall, so that gas will flow rather than diffuse to the gas exit conduits from the gas feed conduits.

The central gas feed conduit can be longer than the rest of the electrode structure, extending outward along the axial length of the electrode, so that exiting, depleted oxidant gas can be used to react with depleted fuel near the extended feed conduit to heat incoming gas. Also, openings can be machined in the outer wall past the active length of the cell, with the openings connecting to the gas exit conduits, to allow depleted gas to flow out of the openings after being used to heat incoming gas, and to combine with depleted fuel. The gas exit conduits are spaced near the outer side wall rather than in the center so that they contact depleted fuel in the generator to preheat incoming air.

Electrolyte and fuel electrode layers can be deposited over the air electrode to form annular cells, which can be electrically connected in series and also in parallel to similar adjacent cells. The term "annular", is used to describe a variety of layered cross-sections, for example, circular or square cross-sections.

The fuel cell configuration of this invention provides a one piece high bulk electrode that incorporates a feed gas tube into the structure, and permits ease of electron travel, helping to eliminate circumferential current flow and circumferential voltage gradients. The elimination of the separate support tube reduces overall cell costs, eliminates one deposition step in manufacturing, and eliminates thermal mismatch and material migration problems. Elimination of the oxidant injector tubes makes for simple, strong, inexpensive, problem free generator design.

BRIEF DESCRIPTION OF THE DRAWINGS

The invention will become more readily apparent from the following description of preferred embodiments thereof shown, by way of example only, in the accompanying drawings, wherein:

FIG. 2 is a view, partially in section of a generator shown in FIG. 1;

FIG. 3 is a schematic view in section showing the separately supported prior art fuel cell design;

FIG. 4 is a cross section through two adjacent electronically connected cells containing a first electrode design;

FIG. 5 is a cross section through an electrode showing a second electrode design;

FIG. 6 is a cross section through an electrode showing a third electrode design;

FIG. 7 is a cross-section through a cell showing a first gas exhaust design for the inner electrode and end closure;

FIG. 8 is a cross-section through a cell showing a second gas exhaust design for the inner electrode and a second closure; and FIG. 9 is a cross-section through a cell showing a third gas exhaust design for the inner electrode and another end closure design.

DESCRIPTION OF THE PREFERRED EMBODIMENT

Figure 1:
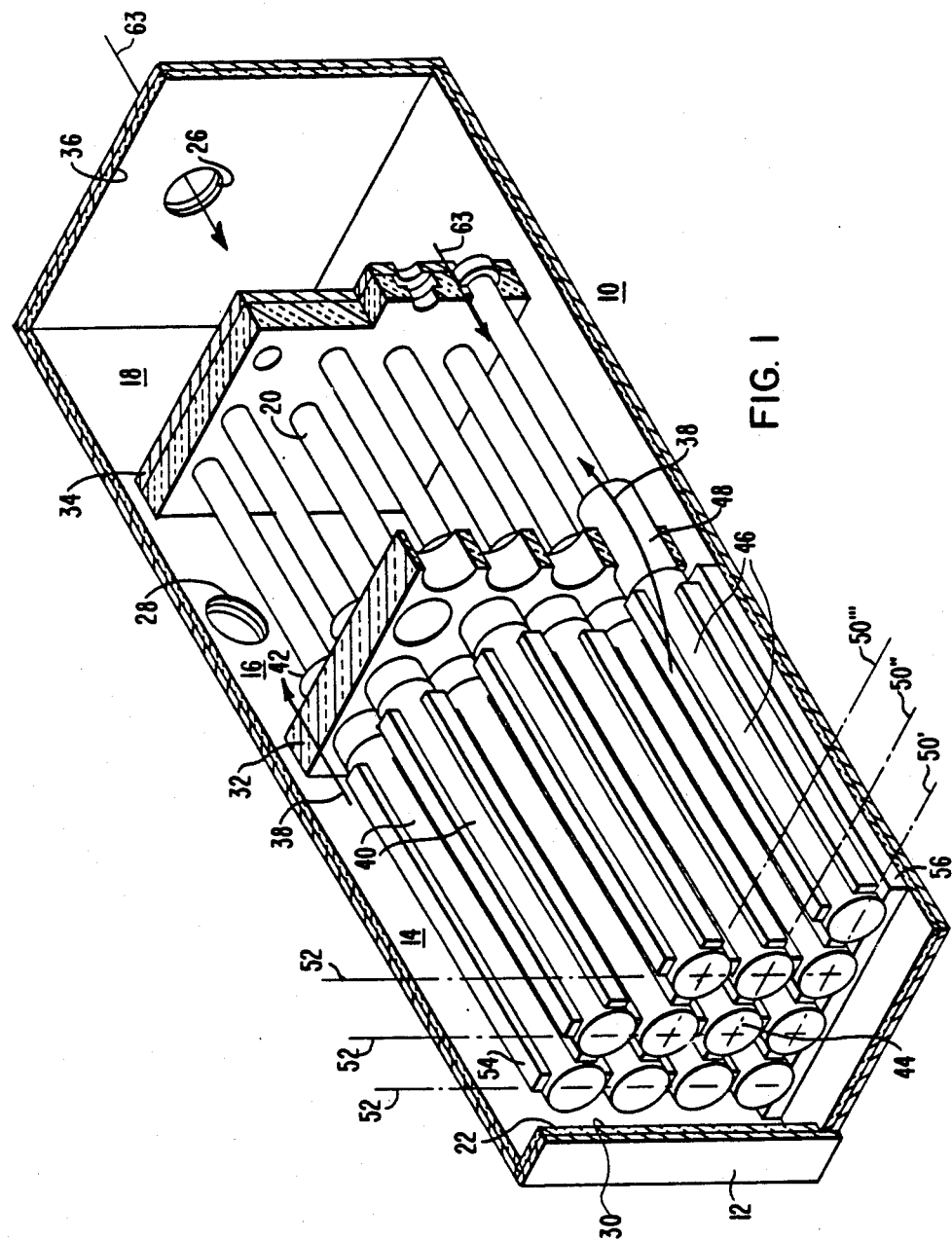
FIG. 1 is a perspective view of a fuel cell generator showing the series-parallel interconnection configuration of the fuel cells of this invention.

Referring now to FIGS. 1 and 2, there is shown one type of a fuel cell generator 10 including a gas-tight housing 12. The housing 12 surrounds a plurality of chambers including a generating chamber 14 and a combustion product or preheating chamber 16. An oxidant inlet chamber 18 can also be contained within the housing 12. Alternatively, other means for manifolding an oxidant or exhausting depleted gases can be utilized. The housing 12 is preferably comprised of steel, and lined throughout with a thermal insulation 22, shown as a thin layer for the sake of simplicity, such as low density alumina insulation. Penetrating the housing 12 and insulation 22 is a fuel inlet port 24, shown best in FIG. 2, an air inlet port 26, and a combustion product outlet port 28, as well as ports for electrical leads.

In the design, the generating chamber 14 extends between an end wall 30 of the housing 12 and a porous barrier 32, such as fibrous alumina felt. The preheating chamber 16 extends between the porous barrier 32 and a support structure for the gas inlet tube portion 20 of the fuel cells 40, such as a tube sheet 34. The oxidant inlet chamber 18 extends between the tube sheet 34 and another end wall 36 of the housing 12. The dividing barriers can include other structural types, and additional support and flow baffles can be incorporated. The shown barriers, the porous barrier 32 and the tube sheet 34, need not be sealed structures. The porous barrier 32, in particular, is designed to allow flow between the generating chamber 14, operating at an approximate pressure slightly above atmospheric, and the preheating chamber 16, operating at a slightly lower pressure. Gas flow is indicated by arrows 38 and 63. While the generator 10 is shown in a horizontal orientation in FIG. 1, it can be operated in a vertical or other position.

High temperature, elongated, solid oxide electrolyte, annular electrochemical cells, such as fuel cells 40 extend between the preheating chamber 16 and the generating chamber 14. The cells, in one design, have completely open ends 42 in the preheating chamber 16, and closed end 44 in the generating chamber 14. The fuel cells are preferably tubular, including a solid oxide electrolyte sandwiched between two electrodes. Each cell includes an electrochemically active length 46 and an inactive length 48. The active length is contained within the generating chamber 14.

Each individual cell generates approximately one volt, and a plurality are electronically interconnected, preferably in a series-parallel rectangular array. For descriptive purposes, the arrangement can be described as including rows 50 and columns 52. Each cell in a row 50 is electronically connected along its active length 46 to the next adjacent cell, preferably through an interconnection flet 54 contacting their outer peripheries. For the preferred configuration shown in FIG. 1, where fuel flows about each cell and an oxidant, such as air, flows within each cell, the anode is the outer periphery of each cell and the cathode is on the inside. Thus, cell-to-cell contact within a row is in parallel, among adjacent anodes.

Each cell in a column 52 is electronically interconnected in series to the next adjacent cell 40. In the preferred configuration, this interconnection is made from the inner cathode of one cell to the outer anode of the next consecutive cell, through an interconnection felt 54. With the preferred configuration described and shown in FIG. 1, cells in the first row 50' operate, for example, at approximately one volt, in the second row 50'' at approximately two volts, in the third row 50''' at approximately three volts, and so forth. Hundreds of cells can be so connected to achieve the desired voltage and current output. The direct current electrical energy thus generated is collected by a single current collector, preferably a conductive metal plate 56 or felt pad, positioned in electronic contact with each cell 40 in the first row 50', and a similar second collector (not shown), positioned in contact with the last row. Electrical leads 58, shown in FIG. 2, are accordingly provided to the current collectors.

Referring to FIG. 3, a supported, prior art fuel cell 40', having a thick support tube 2, which provides structural integrity to the cell, is shown. The support tube was typically comprised of calica stabilized zirconia, forming a wall porous to gas permeation, approximately 1 mm to 2 mm thick. Surrounding the outer periphery of the support tube 2 was a thin porous air electrode or cathode 3. The cathode 3 was typically a composite oxide structure about 20 microns to about 200 microns thick which was deposited onto the support tube through well-known techniques such as plasma spraying, or spraying or dipping in a slurry followed by sintering. Electrolyte 4, fuel electrode 7, interconnect 6 and nickel or cobalt layer 8 are also shown. A gas injector tube, not shown in this Figure, was disposed in the open portion of the support tube.

The prior art support tube is eliminated in the fuel cell design of this invention, one embodiment of which is shown in FIG. 4, which utilizes a high bulk air electrode or cathode 3', having a central, integral gas feed conduit 41 which extends through the length of the air electrode. This air electrode may be made from doped or undoped oxide or mixture of oxides including but not limited to $LaMnO_3$, $CaMnO_3$, $LaNiO_3$, $LaCoO_3$ and $LaCrO_3$. A preferred air electrode material is $LaMnO_3$ doped with Sr. Over the electrode is a gas-tight solid electrolyte 4, typically yttria stabilized zirconia, about 1 micron to about 100 microns thick. A selected longitudinal segment 5, shown best in FIG. 3, along the electrode axial length, is masked during deposition of the electrolyte, to provide a discontinuity, into which, an electronically conductive interconnect material 6' is deposited. The interconnect material 6' must be electronically conductive in both an oxygen and fuel environment.

The interconnect is about 5 microns to about 100 microns thick and is typically made of lanthanum chromite doped with calcium, strontium, or magnesium. Surrounding the remainder of the cell except for the interconnect area is a fuel electrode 7' which functions as the anode. A typical anode is about 30 microns to 200 microns thick and is typically a nickel zirconia or cobalt zirconia cermet. A material 8', which is composed of porous nickel or cobalt metal is also deposited over the interconnect 6'. This material is typically about 30 microns to 200 microns thick.

In the preferred mode of operation, as in the prior art, a gaseous fuel, such as hydrogen or carbon monoxide, is directed over the outside of the cell to contact the fuel electrodes, and a source of oxygen passes through the inside of the cell to contact the air electrodes. The oxygen source forms oxygen ions at the electrode-electrolyte interface, which ions migrate through the electrolyte material to the anode, while electrons are collected at the cathode, thus generating a flow of electrical current in an external load circuit. A number of cells can be connected in series by electronic contact between the interconnect of one cell and the fuel electrode anode of another cell. A more complete description of the operation of this type of fuel cell interconnection system and the fuel cell generator can be found in U.S. Pat. Nos. 4,490,444 and 4,395,468, both herein incorporated by reference.

Referring again to FIG. 4, one of the selfsupporting, axially elongated, unitary designs of the electronically conducting air electrode 3' of this invention is shown, with an integral, central gas feed conduit 41 and four surrounding gas exit conduits 43 disposed near the outer side walls of the electrode, and without the thick, tubular support 2, shown in the prior art FIG. 3. The area 45 around the central oxidant feed conduit 41 is preferably more dense than the rest of the air electrode structure 3', so that oxidant gas will flow to the end of the cell, as shown in the cut away portion of FIG. 2, rather than diffuse through the air electrode structure from conduit 41 to gas exit conduits 43.

Density near conduit 41 can range from about 75% to 90% while density near the outer wall can range from about 20% to 50%. This density gradient can be accomplished during molding or extruding the air electrode, by using a finer particle size of the electrode material in the portion near the gas feed conduit, or by slip casting prior to or after sintering of the electrode. Preferably, the particles used near the gas conduit will range from about 0.1 micron to about 10 microns, while the rest of the electrode will be made from particles ranging from about 10 microns to about 100 microns. Other possible air electrode designs are shown in FIGS. 5 and 6, all of which designs should be considered illustrative, and not in any way limiting. In these cases the plurality of conduits 43 are shown near the outer side wall 50, with at least one additional conduit 41, defined by inner wall 47, where conduit 41 is disposed inwardly from conduits 43 near the sidewall.

As can be seen, almost any type of electrode gas flow configuration can be used, as long as there is at least one feed conduit 41, and at least one exit conduit 43 disposed in the area between the innermost wall 47 and the outer wall 49 of the electrode body. Preferably, the feed conduit will be central to the air electrode cross section, and at least four, most preferably six to eight, exit conduits, as shown in FIGS. 4 and 6, will surround the cental feed conduit.

FIG. 7 shows an enlargement of the crosssection air electrode design, along line VII—VII of FIG. 4. Here, the closed end 44 of the cell is a simple end plug 65, the air electrode is machined or otherwise cut in the green state at the entrance end where gas 63 flows in, to provide an extending air feed inlet conduit tube 20.

As shown, the portion of the electrode structure containing the inner wall, i.e., tube 20, extends outwardly beyond the active length 46 of the cell. Dotted lines show the cut away portions 67 at the entrance end. Cut away portions at the plug end are shown as the hollow portion 67'. In this embodiment, the air enters the integral feed conduit tube 20, flowing down the gas feed conduit 41 until it reaches the closed end at plug 65, where it flows through the passage shown, and then reverse flows countercurrent to the inlet direction through gas exit conduits 43, and into combustion product chamber 16, when the cell is placed in a generator. In the combustion product chamber 16, the depleted oxidant contacts depleted fuel, and both combust to heat incoming oxidant 63. The gas exit conduits 43 are placed near the outer wall, rather than in the center of the electrode, so that this contact with depleted fuel and combustion to preheat incoming air is possible.

The design of FIG. 7 can be modified, as shown in FIG. 8, where a pre-formed end plug 65 is used. An advantage of this design is that the plug 65 cannot be pushed in so far as to cut off incoming oxidant gas, as is possible with the design of FIG. 7. Also, the air electrode can be made shorter than in FIG. 7, and a separate, very dense inlet tube 20 can be cemented to the electrode, 3' at joint 68. FIG. 9 shows an end plug design somewhat similar to that of FIG. 7, except that the hollow portion 67' is made by machining the walls near the end of the oxidant feed conduit, such as at 69. In this embodiment, rather than machining away the entire outer portion of the electrode in chamber 16, holes or other openings, for example circumferential grooves, such as at 71, are made by machining the walls near the entrance end of the electrode structure where the oxidant 63 enters. This would still allow flow of depleted oxidant into combustion product chamber 16. All of these embodiments are to be considered illustrative and not limiting, and show means disposed near the closed end of the electrode structure to allow reverse flow of oxidant feed gas.

The self-supporting air electrode of the invention can be extruded, or it can be molded in a suitable die. After it is formed, and while in the green stage, all of the various heretofore described machining operations can take place. Then it can be sintered at from about 1400° C. to about 1600° C., to provide a strong, unitary body upon which superimposed electrolyte and then fuel electrode can be deposited by well known techniques.

I claim:

1. A self-supporting, elongated electrode, comprising an electronically conductive electrode structure having an inner wall and an outer wall and having an open end and a closed end, where the inner wall defines a conduit through the length of the electrode structure, where the area between the walls contains a plurality of additional conduits through the length of the electrode structure, and where all of the conduits communicate with each other near the closed end of the electrode structure.

2. The electrode of claim 1, where the composition of the structure is more dense near the inner wall.

3. The electrode of claim 1, where the conduit defined by the inner wall is central to the electrode cross-section and there are at least four conduits surrounding the central conduit in the area between the walls.

4. The electrode of claim 1, where a portion of the electrode structure containing the inner wall extends outward along the axial length of the electrode.

5. The electrode of claim 1 where a portion of the outer wall of the electrode has openings therein connecting to conduits disposed in the area between the inner and outer walls.

6. The electrode of claim 1 where the electrode comprises a material selected from the group consisting of $LaMnO_3$, $CaMnO_3$, $LaNiO_3$, $LaCoO_3$, $LaCrO_3$, and mixtures thereof.

7. The electrode of claim 1 where the electrode consists essentially of $LaMnO_3$ doped with Sr.

8. The electrode of claim 1, having a contacting layer of solid electrolyte on the outer wall of the self-supporting electrode and an outer layer of porous electrode on top of the electrolyte, where the outer electrode and the electrolyte have a discontinuity containing an electronically conductive interconnect which extends an axial length along the self-supporting inner electrode.

9. A plurality of the electrode structures of claim 8, where the inner self-supporting electrode is an air electrode, the outer electrode is a fuel electrode, the interconnect on one electrode structure is electronically connected to a fuel electrode of an adjacent electrode structure, fuel is fed to contact the fuel electrodes, and oxidant is fed to contact the air electrodes, where the air enters the conduit defined by the inner wall of the air electrode, flows to closed end of the air electrode and through a passage into the conduit in the area between the air electrode inner and outer walls, and then flows countercurrent to the entering air through the air electrode.

10. The plurality of electrode structures of claim 9, where the electrolyte is yttria stabilized zirconia and the fuel electrode is selected from the group consisting of nickel zirconia cermet and cobalt zirconia cermet.

* * * * *